United States Patent [19]

Ghione

[11] Patent Number: 4,599,937
[45] Date of Patent: Jul. 15, 1986

[54] MACHINE FOR MAKING ESPRESSO COFFEE, PARTICULARLY FOR DOMESTIC USE

[75] Inventor: Roberto Ghione, Alfiano Natta, Italy
[73] Assignee: Hogar S.r.l., Turin, Italy
[21] Appl. No.: 699,866
[22] Filed: Feb. 8, 1985
[30] Foreign Application Priority Data
  May 29, 1984 [IT] Italy .............................. 53440/84[U]
[51] Int. Cl.$^4$ ............................................. A47J 31/30
[52] U.S. Cl. ........................................ 99/293; 99/299; 99/302 R
[58] Field of Search ................ 99/279, 280, 281, 282, 99/283, 293, 294, 295, 298, 299, 300, 301, 302 R; 126/369, 369.1, 369.2, 381; 426/433

[56] References Cited
U.S. PATENT DOCUMENTS
  2,881,692  4/1959  Volcov ........................ 99/302 R
  3,278,087  10/1966  Stasse ........................ 99/302 R FOREIGN PATENT DOCUMENTS
  585904  11/1958  Italy ........................ 99/302

Primary Examiner—Robert W. Jenkins
Attorney, Agent, or Firm—Pearne, Gordon, Sessions, McCoy, Granger & Tilberry

[57] ABSTRACT

An espresso-coffee-making machine, particularly for domestic use, comprises a boiler with electrical heating resistors and a filter cup releasably attached beneath the boiler and connected thereto. The boiler is connected to the filter cup by an upwardly-extending pipe which communicates at its lower end with a lower zone of the boiler for discharging water therefrom, and at its upper end with an upper zone of the boiler located above the maximum level reachable by the water in the boiler, for the subsequent discharge of steam.

4 Claims, 2 Drawing Figures

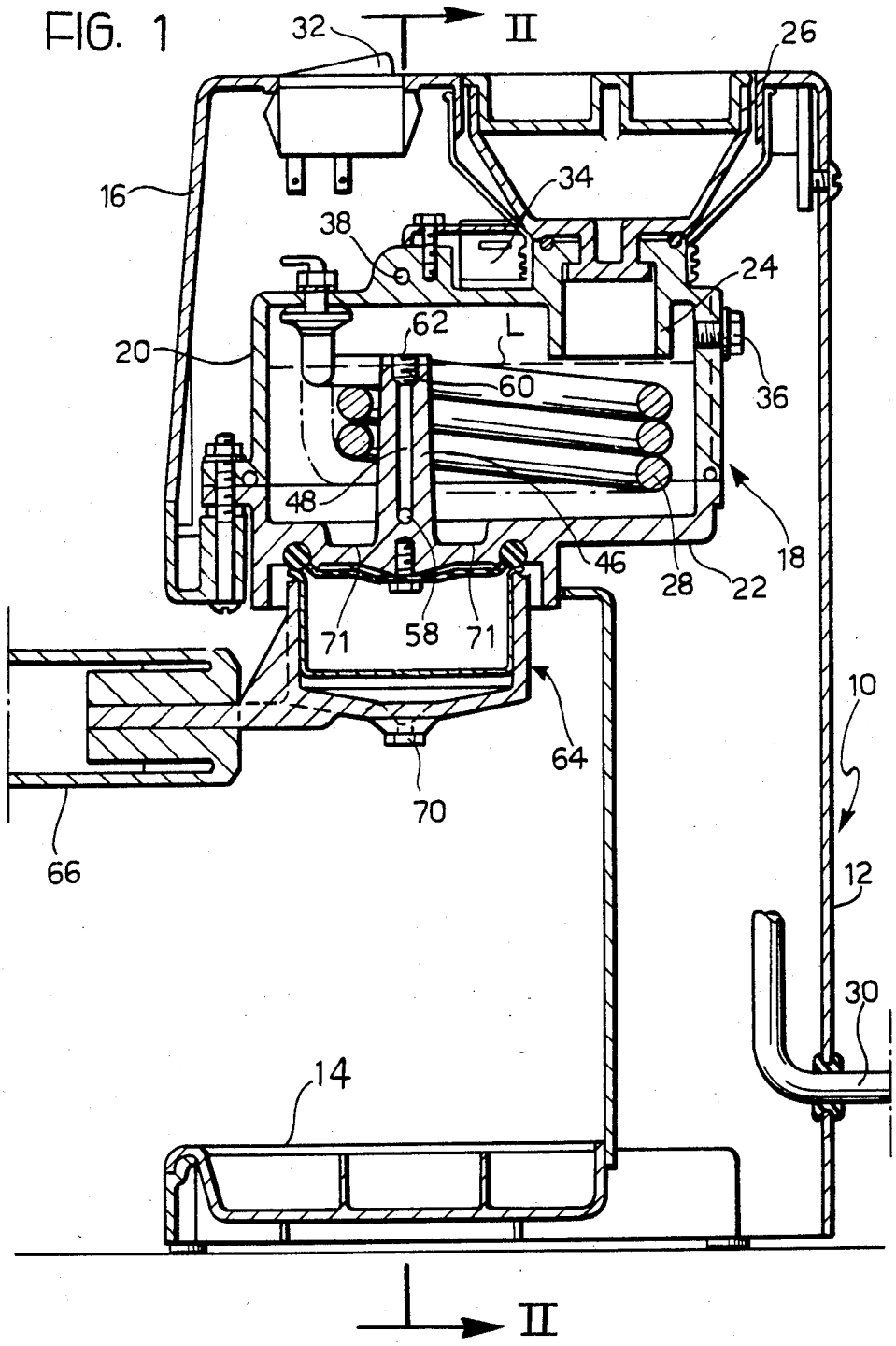

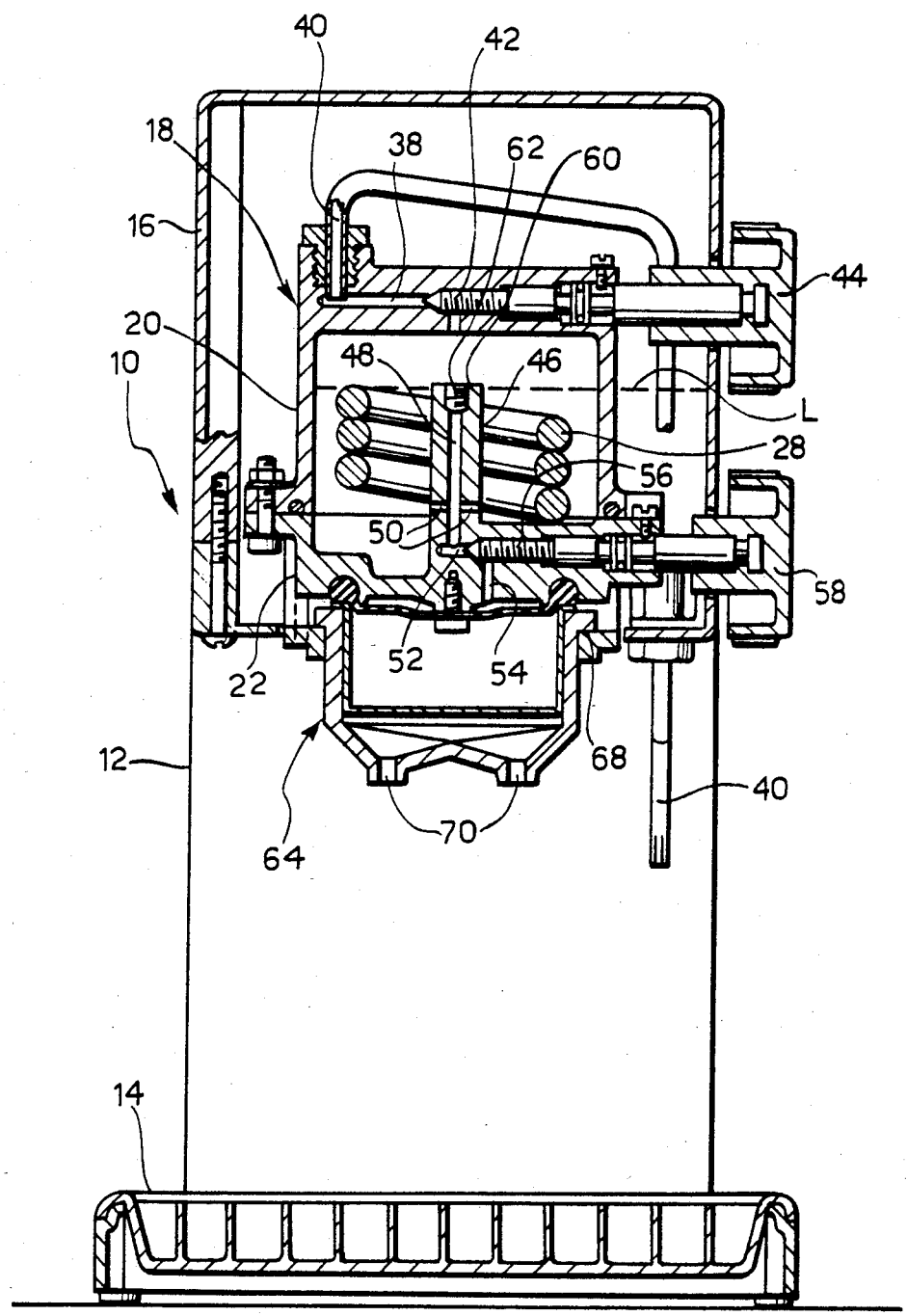

MACHINE FOR MAKING ESPRESSO COFFEE, PARTICULARLY FOR DOMESTIC USE

The present invention relates to espresso-coffee-making machines for domestic use, of the type comprising a boiler with electrical heating resistors, having a sealable aperture for the introduction of water, and a filter cup releasably attached beneath the boiler and connected thereto.

In a machine of this type, the passage of the hot water from the boiler to the filter cup containing the powdered coffee occurs naturally, that is, without the aid of a pump. Such machines are thus simpler and cheaper to manufacture than those which make use of a water pump. Moreover, the absence of the pump reduces the energy consumption and noise of these machines, increasing their reliability of operation.

In such machines there is a problem of obtaining, at the time of use, a layer of coffee froth on the surface of the coffee infusion supplied to the cups located beneath the filter cup, in order to make the infusion more agreeable to the consumer.

It is well known that the coffee froth is formed by the steam generated within the boiler and discharged by the latter towards the filter cup after the water. In order to obtain a consistent layer of froth, therefore, it is necessary to control the delivery of steam and make it occur as late as possible, and in any case after at least two-thirds of the water in the boiler has percolated through the filter cup.

This is difficult to achieve with conventional machines of the type defined above and it is thus not possible to form coffee froth effectively with them, particularly when the machine is arranged to supply two cups simultaneously.

The object of the present invention is exactly that of avoiding this disadvantage and of providing an espresso-coffee-making machine for domestic use, of the type defined at the beginning, in which the delivery of steam is controlled automatically in use so as to obtain an effective quantity of coffee froth even, and particularly, when the machine is arranged to supply the infusion to two cups simultaneously.

According to the invention, this object is achieved by virtue of the fact that the boiler of the machine is connected to the filter cup by an upwardly-extending pipe which communicates with the lower zone of the boiler for discharging water contained therein, and at its upper end with a zone of the boiler located above the maximum level reachable by the water introduced into the container, for the subsequent discharge of steam.

According to the invention, the pipe communicates with the upper zone of the boiler through a restricted passage.

Normally, the communication between the pipe and the filter cup is controlled by a manually operable on-off valve.

The invention will now be described in detail with reference to the appended drawings, provided purely by way of non-limiting example, in which:

FIG. 1 is a schematic vertical section of an espresso-coffee-making machine according to the invention, FIG. 2 is a section taken on the line II—II of FIG. 1.

In the drawings, an espresso coffee machine for domestic use is generally indicated 10 and includes a support structure 12 the lower part of which forms a base 14 for supporting a couple of cups located side by side.

The upper part 16 of the structure 12 houses an electric boiler, generally indicated 18, for heating the water for the infusion of coffee.

The boiler 18 includes an upper part 20 and a bottom 22 fixed sealingly to the upper part 20.

On one side, the upper part 20 has a tubular water-inlet member 24 which extends downwardly into the boiler 18 to a level L and the upper end of which can be sealed hermetically, with a bayonet-type coupling, by a stopper 26 accessible from the top of the structure 12.

The upper part 20 supports an electrical heating resistor 28, which is water-tight, insulated electrically with respect to earth, and connectible to an electrical supply through an electric lead 30 and a switch 32, and a thermostat 34 associated with the resistor 28.

The upper part 20 also has an excess pressure safety-valve 36, as well as a passage 38 for supplying the steam generated in the boiler 18 to a delivery tube 40. The communication between the interior of the boiler 18 and the passage 38 is controlled by means of an on-off needle valve 42 which can be operated manually from the exterior by means of a knob 44.

The bottom 22 of the boiler 18 has an integral central vertical protuberance 46 which extends up to a level above the level L and in which an axial duct 48 is formed. The duct 48 communicates with the lower zone of the boiler 18 through a series of radial ports 50 and, lower down, with a horizontal passage 52 connected in turn to a vertical passage 54. The communication between the passages 52 and 54 is controlled by means of an on-off needle valve 56 which can be operated from the exterior by means of a knob 58.

The bottom 22 of the boiler 18 has a sump 71 the function of which is to ensure a reserve of water to avoid the risk of damage to the resistor 28 due to lack of water in use.

The upper end of the duct 48 is threaded and carries a dowel 60 in which is formed a through-hole 62 of reduced diameter compared with the diameter of the lower ports 50.

A filter cup, indicated 64, has a handle 66 and is attached sealingly beneath the bottom 22 of the boiler 18 by means of a bayonet coupling 68. The filter cup 64 is intended to contain the powdered coffee and has a pair of delivery nozzles 70 in its bottom for supplying the infusion of coffee to the cups resting on the base 14.

As is clearly seen in FIG. 2, the filter cup 64 communicates with the passage 54 and is thus connected to the duct 48 through the on-off valve 56.

In use, the water for making the espresso coffee is poured into the boiler 18 through the inlet union 24, the stopper 26 having been removed of course.

Clearly, the boiler 18 may be filled to the level L which, as stated, is located below the upper end of the tubular protuberance 46 or the narrow hole 62.

Once the stopper 26 has been replaced, the switch 32 is operated to supply the resistor 28 and hence effect the thermostatically controlled heating of the water in the boiler 18.

During this stage, the on-off valve 56 is normally kept closed until a light, not visible in the drawings and controlled by means of the thermostat 34, indicates that the temperature of the water has reached a predetermined value. At this point, the valve 56 is opened by means of the knob 58 and allows hot water to pass through the ports 50 to the duct 48 and, from there, through the passages 52 and 54 to the filter cup 64 containing powdered coffee. The hot water thus percolates through the powdered coffee in the cup 68, resulting in the infusion of coffee which reaches the cups located on the base 14 through the delivery nozzles 70.

By virtue of the shape of the tubular protuberance 46, the steam generated in the boiler 18 can reach the filter cup 64 only towards the end of the delivery stage, that is, normally when two-thirds of the water in the boiler is already in the cups. Thus, an effective layer of coffee froth is formed on the surface of the liquid coffee in the cups at the end of the delivery.

Clearly, the discharge of water or steam through the passage 54 may be stopped at any time by the simple operation of the knob 58 which closes the valve 56. This allows steam to be drawn from the boiler 18 at will by the operation of the knob 44 to open the valve 42. The steam drawn off in this way is delivered by the tube 40 and may be used for heating drinks by blowing steam through them.

Naturally, the scope of the present invention extends to models which achieve equal utility by using the same innovative concept.

What is claimed is:

1. A machine for making espresso coffee, particularly for domestic use, comprising a boiler having electrical heating resistors and defining a sealable aperture for the introduction of water, and a filter cup releasably attached beneath the boiler and connected thereto, wherein the boiler defines a lower zone for containing water and an upper zone above the maximum level reachable by the water in the lower zone, and wherein the boiler is connected to the filter cup by an upwardly-extending pipe, the pipe communicating at its lower end with the lower zone of the boiler for discharging the water therein and at its upper end with the upper zone of the boiler for the subsequent discharge of steam.

2. A machine as defined in claim 1, wherein the pipe defines a restricted passage for its communication with the upper zone of the boiler.

3. A machine as defined in claim 1, wherein it includes a manually-operable on-off valve for controlling the communication between the pipe and the filter cup.

4. A machine as defined in claim 1, wherein the pipe is defined by a tubular protuberance integral with the bottom of the boiler.

* * * * *